July 22, 1969

L. E. DUNLAP 3,456,555

FLEXIBLE GUIDE FOR CUTTING TOOLS

Filed Oct. 10, 1966

INVENTOR.
LAUREL E. DUNLAP
BY
MAHONEY & HORNBAKER
ATTORNEYS

United States Patent Office 3,456,555
Patented July 22, 1969

3,456,555
FLEXIBLE GUIDE FOR CUTTING TOOLS
Laurel E. Dunlap, 4510 Mary Ellen Ave.,
Sherman Oaks, Calif. 91403
Filed Oct. 10, 1966, Ser. No. 585,481
Int. Cl. B23c 1/20; B23d 1/00, 3/00
U.S. Cl. 90—12    4 Claims

ABSTRACT OF THE DISCLOSURE

A resilient, longitudinally extending guide track is adhesively secured, selectively removable, over a workpiece surface exactly uniformly laterally spaced from a predetermined longitudinal path of working operation. The cutter of a cutting tool is supported movable along the path of working operation by a support roller at one side movable along the workpiece surface and a pair of longitudinally spaced guide rollers at the opposite side engaged downwardly over and guided by the guide track. The support roller preferably has a transversely convex peripheral surface contacting the workpiece surface for ease in turning of the cutting tool and the guide rollers preferably have angled roller surfaces mating with similar angled surfaces of the guide track for exact guiding of the cutting tool by the guide track.

---

This invention relates to a flexible guide for cutting tools and, more particularly, to a guide track which may be temporarily or permanently installed in a particular fashion and pattern on a workpiece and co-operates with roller guide means supported on the particular cutting tool for guiding the cutting tool in a predetermined path along the workpiece. Even more specifically, one form of my invention relates to a flexible guide track which may be temporarily installed on a workpiece having an irregular surface along which a particular cutting operation must be performed, with this flexible guide track co-operating with unique guide roller means on the cutting tool for guiding the cutting tool over the predetermined path along the workpiece and despite the irregularity of the workpiece.

Many tedious cutting operations which extend a relatively long distance over a workpiece are presently performed by the use of hand held tools wherein it is necessary for the operator holding the tool to attempt to maintain the tool precisely positioned relative to the workpiece and for a long period of time in order to cover the extreme distance along the workpiece. For instance, assume that a butt weld is formed between two metal plates, which butt weld will necessarily result in raised weld portions extending above the surfaces of the butted plates. In such an instance, it would be common present day practice to have a workman using a hand held power tool to attempt to cut the protruding portions of the weld and smooth the weld to conform with the surfaces of the butted metal plates.

In order to perform such an operation properly, it is necessary for the workman to support the power cutting tool by hand exactly aligned with the weld portion to be removed and, at the same time, at a proper elevation so that the surfaces of the steel plates are not touched by the cutting tool and thereby damaged. Obviously, this is virtually impossible and in most instances, has resulted in not only extreme fatigue of the workman, but also a resulting weld which is not properly smoothed and resulting steel plates which have been accidentally cut and scarred.

It is, therefore, an object of my invention to provide a guide track for cutting tools which may be installed either temporarily directly on the surface of a workpiece or on a supporting surface adjacent the workpiece and which co-operates with unique guide roller means mounted on the cutting tool for automatically guiding the path of travel of the cutting tool along the workpiece and precisely and exactly accomplishing the particular cutting operation on the workpiece. This may be accomplished by forming an elongated guide track having a uniform cross section throughout the length thereof and forming upwardly and longitudinally extending, equally spaced side track surfaces uniformly spaced from the line along the workpiece at which the cutting operation is to be preformed. Further, the cutting tool is formed with a pair of longitudnially spaced guide rollers mounted thereon and in co-operation with a supporting roller, supporting the cutting tool on the workpiece, with the longitudinally spaced guide rollers having spaced guide flanges thereon adapted to co-operate and be guided by the guide surfaces on the guide track when these guide rollers are received over the guide track, thereby positioning the cutting tool movable exactly along the line of the workpiece at which the cutting operation is to be performed.

It is a further object of my invention to provide a guide track for cutting tools of the foregoing general type in which the guide track may be formed of flexible material and may serve to guide the cutting tool over an irregular surface and in an irregular path of the workpiece. The guide track may be formed, for instance, of a resilient material, such as rubber or plastic, and may have reinforcing materials embedded therein for additional strength or covering the side guide surfaces thereof for additional wearing qualities. This flexible guide track may be installed on the workpiece by means of any of the usual adhesives, either permanently or temporarily.

It is an additional object of my invention to provide a guide track for cutting tools having the foregoing attributes which requires little additional structure on a conventional, normally hand held cutting tool so as to easily adapt this normally hand held cutting tool to one which is automatically guided along the workpiece upon which the cutting operation is being performed. The only additional structure required is the mounting of the guide rollers and supporting roller on the cutting tool frame and the mounting of the guide track on or adjacent the surface of the workpiece. In this manner, the construction of the present invention may be simply and economically added to the conventional cutting tool, yet clear advantages are obtained therefrom, both as to ease of operation and perfection in the cutting operation performed.

Other objects and advantages of the invention will be apparent from the following specification and the accompanying drawing which is for the purpose of illustration only, and in which.

Figure 1:
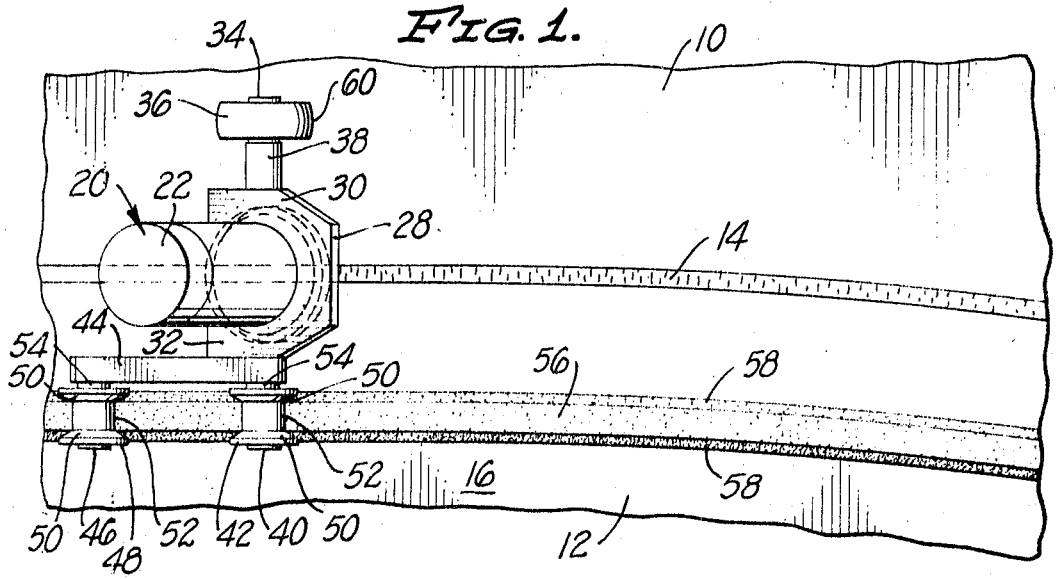
FIG. 1 is a fragmentary, top plan view of a workpiece having a cutting tool mounted thereon for movement therealong by the guide track construction according to the principles of the present invention.
Figure 2:
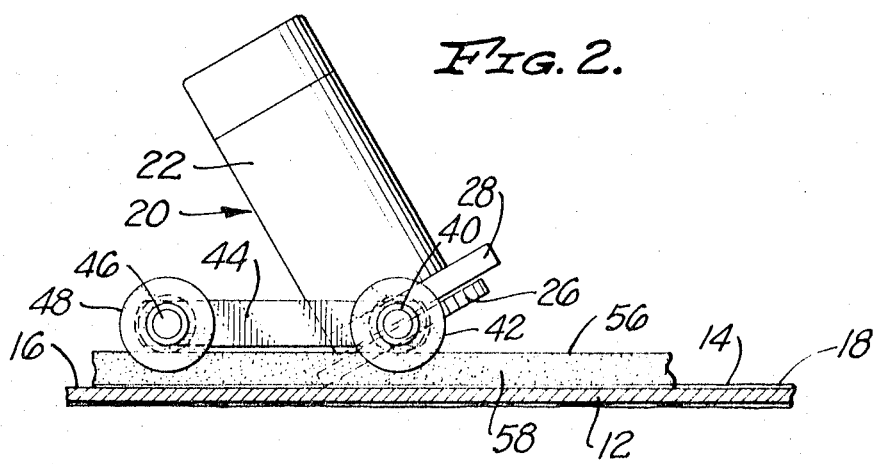
FIG. 2 is an enlarged, fragmentary, side elevational view of the construction of FIG. 1.
Figure 3:
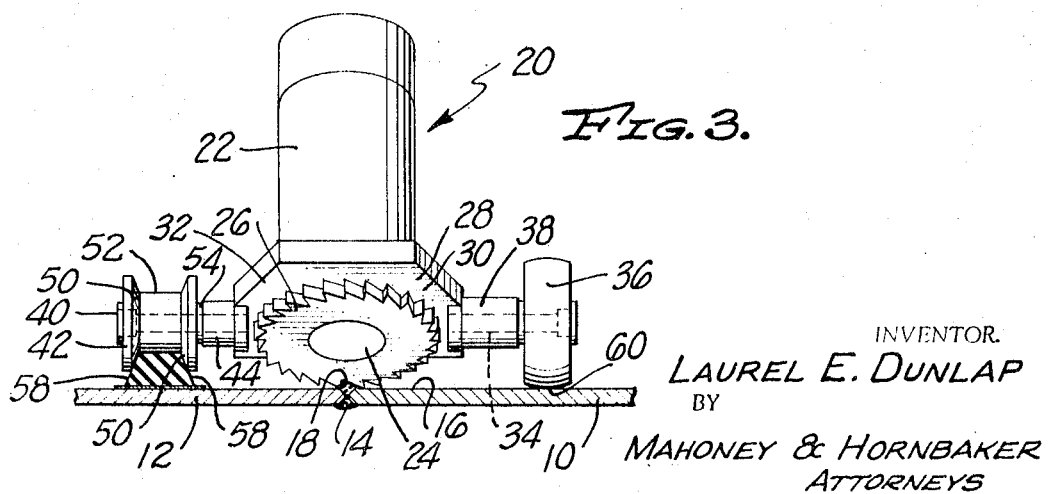
FIG. 3 is an enlarged, fragmentary, front elevational view of the construction of FIG. 1 with the guide track shown in section.

Referring to the drawing, the cutting tool guide construction of the present invention is illustrated supporting a power driven rotatable cutter positioned for cutting the raised weld portion resulting from the usual butt weld between butting metal plates. By such showing, it is not intended to limit the principles of the present invention to the particular workpiece or cutting tool shown, since the present invention has relatively wide application for various forms of workpieces and cutting tools, power operated or otherwise.

As shown, the workpiece may be formed by the metal plates 10 and 12 which are joined at the edges thereof by the butt weld 14 so as to form the horizontal workpiece surface 16 and the raised weld portion 18 extending in a line along the plate surface 16. Although, in this case, the workpiece surface 16 is shown as extending horizontally, it is obvious that this surface may extend irregularly upwardly and downwardly, as will be apparent from a description of the guide construction of the present invention below. Also, although the raised weld portion 18 is shown as extending in a straight line, this too may extend irregularly without departing from the principles of the present invention.

The powered cutting tool, generally indicated at 20, includes the frame 22 rotatably mounting the shaft 24 and to which is secured the cutter 26 for rotation by the shaft. The powered cutting tool 20 is of conventional form and may be powered from the usual source of electricity, not shown, or by any other usual means.

Additionally, the cutting tool frame 22 may be formed with a bottom mounting plate 28 spaced above the cutter 26 and through which the rotatable shaft 24 extends. This mounting plate 28 is formed with the horizontally extending side flanges 30 and 32, with flange 30 horizontally mounting the support roller shaft 34 which, in turn, rotatably supports the support roller 36. Support roller 36 is spaced horizontally from the flange 30 by a spacer 38 and this support roller serves as one of the side movable supports for the cutting tool 20 over the plate surface 16 as shown.

The side flange 32 of frame 22 supports the horizontally extending guide roller shaft 40 upon which is mounted the forward guide roller 42 spaced horizontally outwardly from flange 32. Also, positioned transversely between the flange 32 and forward guide roller 42 is the roller support bar 44 which receives the guide roller shaft 40 therethrough and for relative rotation therebetween. Roller support bar 44 extends horizontally rearwardly of the flange 32 and the cutting tool 20 and at the rearward end thereof supports the roller guide shaft 46 which in turn rotatably supports the rear guide roller 48.

The forward and rear guide rollers 42 and 48 are longitudinally aligned and are substantially identical, each including the equally spaced guide flanges 50 forming the generally U-shaped cross section guide grooves 52. Further, guide rollers 42 and 48 are maintained spaced transversely from the roller support bar 44 by the spacers 54, and the support bar 44 is secured to the frame flange 32 so that the longitudinal spacing of these guide rollers will support the cutting tool 20 in its rearwardly angled position, as shown. Selectively adjustable means, not shown, may be provided between the support bar 44 and the frame 22 of the cutting tool 20, if desired, for adjusting the angled position of the cutting tool in the usual manner for adjusting the angle of the cutter 26 relative to the workpiece.

A guide track 56 is preferably removably positioned on the plate surface 16, with this guide track extending longitudinally along and equally transversely spaced from the weld 14. This guide track 56 is preferably formed of a flexible material, such as a resilient rubber material, and has a uniform transverse cross section conforming to the guide grooves 52 of the forward and rear guide rollers 42 and 48. Thus, guide track 56 is formed with the transversely equally spaced, longitudinally extending side guide surfaces 58, which side guide surfaces preferably angle inwardly and upwardly so as to conform with the downwardly outwardly angled surfaces on the guide flanges 50 of the forward and rear guide rollers 42 and 48. Furthermore, the forward and rear guide rollers 42 and 48 may be received over and engaging the guide track 56 with the side guide surfaces 58 of the guide track abutting the guide flanges 50 of the forward and rear guide rollers.

In this manner, the cutting tool 20 will be guided over the surface 16 of the metal plates 10 and 12 exactly in accordance with the longitudinal and upward and downward extension of the guide track 56 and with the guide track being positioned on surface 16 maintained always equally spaced from the weld 14, the cutting tool 20 will be guided during the cutting operation exactly along the weld 14. At the same time, the support roller 36 will aid in this support and directed movement of the cutting tool 20, and it is preferred, in order to provide maximum freedom of direction between the guide track 56 and the forward and rear guide rollers 42 and 48, to form the roller support surface 60 of support roller 36 convex in transverse cross section, as shown, so that a minimum of surface contact is made between the roller support surface 60 and the plate surface 16.

In the case where the guide track 56 is mounted on the surface of the workpiece, as is the particular situation shown, this guide track will only be mounted thereon temporarily for use during the particular cutting operation. Thus, the guide track would be secured to the workpiece surface by some form of usual adhesive means which will securely position the guide track during the effective use thereof but yet permit the guide track to be easily separated from the workpiece surface for use in another cutting operation on another workpiece. In the case where the guide track is mounted on some form of adjacent frame which extends along but does not form a direct part of the workpiece, the guide track may be permanently secured thereto and this is particularly true where the cutting operation to be performed is one which is constantly repeated and follows the exact same pattern for a series of workpieces.

Also, where the guide track 56 is formed of a flexible material, such as the usual resilient materials or an easily deformable metal, this guide track may be mounted on and will serve the guiding function with virtually any workpiece surface regardless of the irregular extension of this surface vertically and regardless of the irregular extension of the line of work upon the workpiece surface to be performed. The transverse engagement between this guide track and the guide flanges 50 on the guide rollers 42 and 48 will always maintain the cutting tool 20 movable in a corresponding path to the path of extension of the guide track regardless of the irregular extension thereof.

I thereby provide with my invention a guide construction for cutting tools wherein the cutting tool is automatically guided over a predetermined path along the surface of a workpiece by transversely spaced support and guide roller means. The support roller means may have merely a convex surface of minimum surface contact and movable over the workpiece surface, but the guide roller means must be formed so as to engage a roller guide track which is mounted on the workpiece surface or an adjacent surface in a predetermined path spaced equally from the line along which the particular work operation is to be performed so that the co-operation between the guide roller means and guide track will precisely guide the cutting tool throughout the longitudinal extent of the working operation. Also, a transverse flanged engagement is provided between the guide roller means and guide track in order to maintain the alignment of the path of travel of the work tool with the line of working operation along the workpiece.

I claim:

1. In a guide support for cutting tools supporting the cutting tool movable along a predetermined longitudinal path over a workpiece surface and conforming to a predetermined longitudinal path of working operation the combination of: a cutting tool having cutting means thereon for performing the working operation; a flexible resilient material guide track having a uniform transverse cross section and transversely spaced, longitudinally continuous side guide surfaces, said guide track being positioned over the workpiece surface with said continuous side guide surfaces projecting upwardly from said workpiece surface; adhesive means for securely but selectively removably mounting said guide track over said workpiece surface extending longitudinally and uniformly transversely spaced from the predetermined longitudinal path of working operation; transversely spaced support roller means and guide roller means operably connected to said cutting tool at transversely opposite sides and transversely spaced from said cutting tool cutting means for mounting said cutting tool movable over said workpiece surface, said support roller means being supported on and movable over said workpiece surface, said guide roller means including at least two guide rollers longitudinally spaced and each having a groved peripheral surface forming transversely spaced roller surfaces, said guide roller surfaces of each of said guide rollers being exactly transversely spaced and formed to continuously contact both of said side guide surfaces of said guide track, said guide rollers being engaged over said guide track means with said roller surfaces of said guide rollers transversely and continuously engaged with said guide surfaces of said guide track means for guiding said cutting tool in an exact longitudinal path relative to said guide track means and said cutting means thereof exactly along said predetermined longitudinal path of working operation.

2. In a guide support for cutting tools as defined in claim 1 in which said support roller means includes a roller having a transversely convex peripheral surface contacting said workpiece surface with a minimum surface contact to provide ease of turning of said cutting tool as guided by said guide track.

3. In a guide support for cutting tools as defined in claim 1 in which certain of said side guide surfaces of said guide track and said guide roller roller surfaces are angled to ensure said continuous contact between said side guide surfaces and said roller surfaces.

4. In a guide support for cutting tools as defined in claim 1 in which all of said side guide surfaces of said guide track and said guide roller roller surfaces are mating angled surfaces to insure said continuous contact between said side guide surfaces and said roller surfaces; and in which said support roller means includes a roller having a transversely convex peripheral surface contacting said workpiece surface with a minimum surface contact to provide ease of turning of said cutting tool as guided by said guide track.

References Cited

UNITED STATES PATENTS

| | | | |
|---|---|---|---|
| 699,285 | 5/1902 | Clover | 90—12 X |
| 2,578,371 | 12/1951 | Plester | 90—12 |
| 2,625,860 | 1/1953 | Plester | 90—12 |
| 2,921,492 | 1/1960 | Worth | 90—12 X |
| 3,285,102 | 11/1966 | De Voss | 77—7 X |

ANDREW R. JUHASZ, Primary Examiner

G. WEIDENFELD, Assistant Examiner

U.S. Cl. X.R.

51—100; 90—24